Jan. 10, 1956   J. J. JAKOSKY   2,730,673
MAGNETOMETER

Filed Jan. 20, 1947   4 Sheets-Sheet 1

John Jay Jakosky
INVENTOR.

BY Ross J. Garofalo
ATTORNEY

Jan. 10, 1956

J. J. JAKOSKY 2,730,673

MAGNETOMETER

Filed Jan. 20, 1947

John Jay Jakosky
INVENTOR.

BY Ross J. Garofalo
ATTORNEY

Jan. 10, 1956  J. J. JAKOSKY  2,730,673
MAGNETOMETER
Filed Jan. 20, 1947  4 Sheets-Sheet 3

MAGNETIC FIELD INTENSITY H

ELECTRODE POSITION OR STATION

John Jay Jakosky
INVENTOR.

BY
Ross J. Garofalo
ATTORNEY

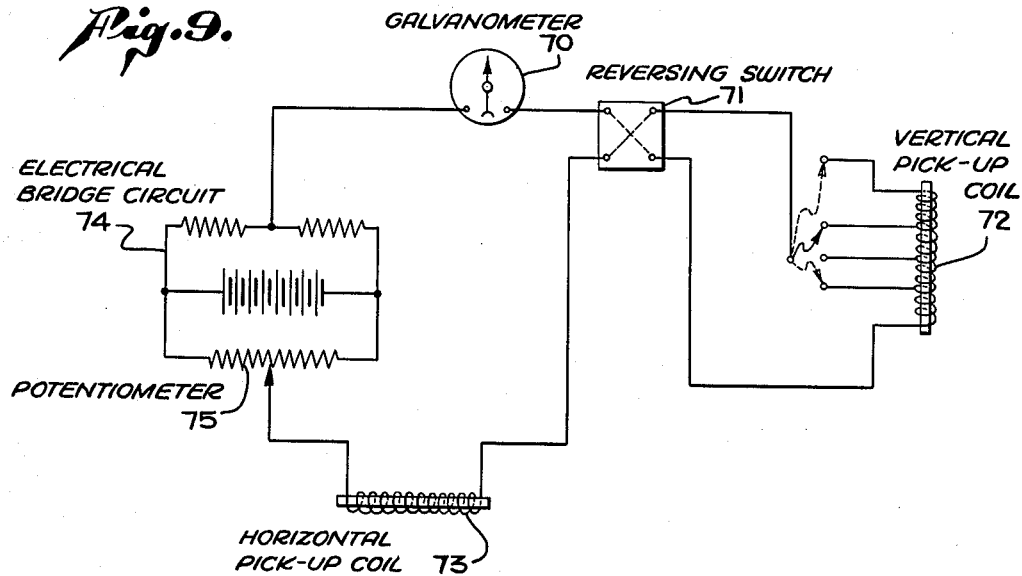
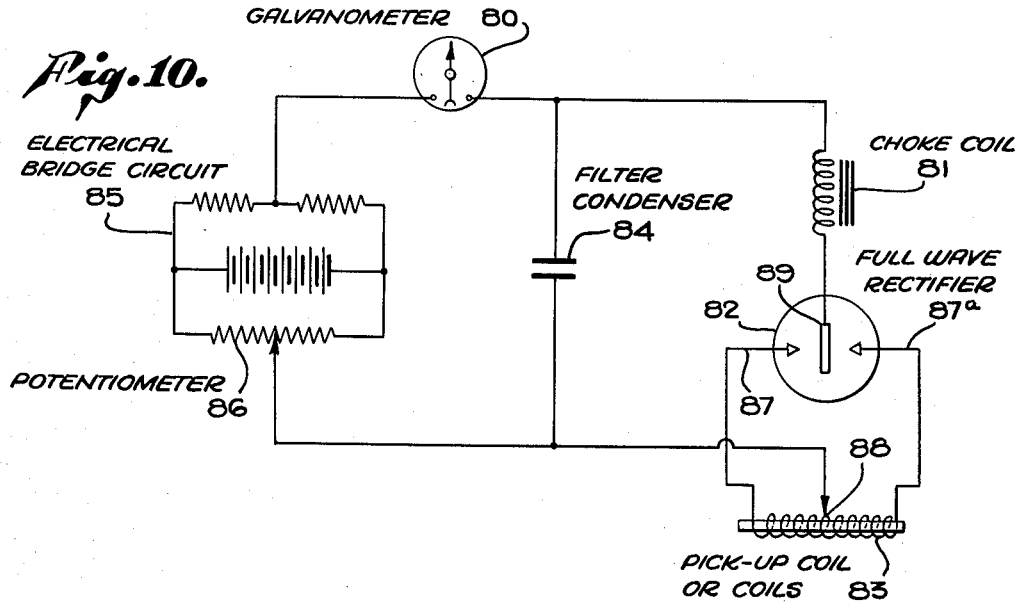

United States Patent Office 2,730,673
Patented Jan. 10, 1956

2,730,673

MAGNETOMETER

John Jay Jakosky, Los Angeles, Calif., assignor to Union Oil Company of California, Los Angeles, Calif., a corporation of California Application January 20, 1947, Serial No. 723,049

15 Claims. (Cl. 324—7)

This invention relates to the study of underground structure by means of observations made at the earth's surface. More particularly it relates to the determination of an anomaly in the electrical conductivity of the underground structure by magnetometric measurements at the surface which are a function of such anomalies. Such anomalies may be due, for instance, to the presence of mineralized bodies or other strata having characteristic electric conductivities such as, for example, oil strata or water strata.

More specifically, the subject of this invention comprises an electromagnetic method of subsurface surveying comprising the passage of an electric current through the earth and the measurement of the induced magnetic field created by such current flow and suitable apparatus for effecting such current flow and measurement of resultant magnetic fields.

Magnetometric prospecting is the type of electrical prospecting wherein the subsurface conditions are diagnosed by studying the variations at the surface of the ground of the magnetic field associated with the subsurface flow of direct or very low frequency alternating current. The current is passed into the earth between two electrodes properly spaced and oriented with regard to the general geological conditions in the area under investigation. The magnetic field at the surface of the earth is measured by means of a magnetometer, which usually is of the horizontal component type.

A magnetometer useful in magnetometric prospecting must have certain operating characteristics which may differ from the conventional instruments used in magnetic prospecting, such as:

1. Sensitivity per scale division should remain fairly constant for different orientations. Conventional instruments for measuring magnetic fields comprise a pivoted magnetic system balanced against the earth's gravitational field, such as in the Schmidt magnetic balance, for example. Such instruments must be carefully oriented with respect to the earth's magnetic field in order to obtain accurate results.

2. Sensitivity per scale division should be from ¼ to 3 gammas per readable division and should be linear over the entire range of measurement. This sensitivity is from 10 to 20 times greater than conventional instruments.

3. The instrument must be capable of operating in the earth's magnetic field wherein the maximum magnetic inclination may vary from 0° at the equator to 90° at the earth's magnetic poles.

4. The instrument should have maximum sensitivity for the horizontal component of a magnetic field.

5. The instrument should either be readily adjustable to allow for rapid changes in orientation or be of such construction so as to eliminate the effects of such changes in orientation. This is necessary because of the changes in orientation of the energizing electrodes by means of which the electrical energy is passed through the subsurface during the survey operations.

In previously used methods of underground surveying in which measurements are obtained by causing an electric current to flow through the earth and taking observations of the electromagnetic field thus created, it has been customary to measure such electromagnetic field by, (1) inductive methods, that is, by causing such field to induce an electric current in a loop, coil or other detecting circuit, and in order to obtain an induced current of sufficient intensity to permit accurate measurements thereof, it has been found generally necessary to use a subsurface current of relatively high frequency; or (2) magnetic balances which, due to their inherent low sensitivity, require a subsurface exciting current of high intensity and steady state. In one specific instance it has been proposed to use a unidirectional current and to measure the resulting electromagnetic field by means of the current induced in a rotating coil.

It is an object of this invention to provide a more sensitive, more rapid, more accurate, and more convenient method and apparatus for underground survey by means of surface observations, whereby errors due to surface and near-by inhomogeneities and to the diurnal magnetic variations are eliminated or reduced to a negligible minimum.

A further object of this invention is to provide an electromagnetic method and apparatus for underground survey whereby the errors common to the conventional electrical methods of underground survey, such as, for example, eddy current, phase effects and polarization effects, are substantially eliminated.

A more particular object of the invention is the accomplishment of the aforementioned objects with an instrument so constructed as to possess a higher degree of sensitivity than previously obtainable, having a sensitivity of approximately 0.5 gamma per scale division, and being substantially free of delicate moving parts.

It is a further object to provide an instrument possessing a consistency of scale value regardless of angle of orientation with respect to the earth's magnetic field. Such an instrument possesses the advantage over conventional instruments utilized for this purpose in that the latter vary in sensitivity depending upon their orientation.

Other objects and advantages of the present invention will become apparent to those skilled in the art as the description thereof proceeds.

The method of the present invention comprises causing an electric current to flow through the earth between two separate points and taking direct measurements, at the earth's surface, of the intensity, and if desired, the direction, of the magnetic field set up by such an underground current flow.

The electric current employed is preferably current other than high frequency alternating current, or more specifically, other than current having a frequency in excess of 10 cycles per second, that is to say, the current utilized is preferably either unidirectional current or an alternating current having a frequency less than 10 cycles per second.

The instrument by which the aforementioned magnetic field is measured comprises essentially the combination of a pick-up coil or coils, a galvanometer type of indicating instrument, and necessary controls and battery supply.

The pick-up coil or coils preferably comprise a magnetic alloy bar over which is wound a single multilayer insulated copper winding. Any change in the magnetic field passing through the alloy bar causes a corresponding change in the flux linking this coil. Changes in flux cause a corresponding current flow in the coil and its associated magnetometer circuit.

It is to be understood that this bar may be of any desired dimensions and may be of any magnetically permeable metal. It has been found convenient to employ an iron alloy bar, commercially available under the trade name of MU metal, approximately one inch in diameter and approximately 5½ feet in length, but these dimensions may be varied over considerable limits.

When the flow of subsurface current is started an electromagnetic field is induced around the effective subsurface current path causing flux linkages, commonly called "lines of force," to intersect the pick-up coil and cause a current to flow through the coil and its associated magnetometer circuit. When a direct or unidirectional current is caused to flow through the subsurface the induced magnetic field increases to a maximum constant intensity and remains substantially unchanged so long as the subsurface exciting current remains constant. The energy introduced into the magnetometer circuit during the build-up of the magnetic field is equal to the time-current squared integrated product and is proportional to the intensity of the magnetic field and the constants of the system. In order to accomplish the measurements of the time-current squared integrated product a specially constructed galvanometer is employed in which the restoring torque normally associated with the moving coil suspension has been compensated for by the introduction into the moving mechanism of a small permanent magnet. Thus the deflection of the moving coil of the galvanometer under the influence of an increasing magnetic field is not counteracted by the restoring torque of the moving coil suspension which would normally tend to return the indicator to its zero position. This type of compensated galvanometer is applied to the measurement of the intensity of the magnetic field induced by the passage of direct or unidirectional electric current through the earth.

When a low frequency alternating current is passed through the earth the electromagnetic field induced is not constant but varies in intensity at a frequency equal to that of the exciting current. Because of this, certain modifications must be made in the magnetometer for measuring such low frequency magnetic field intensities. The variation in magnetic field strength at the surface causes the so-called lines of force to intersect the pick-up coil continuously in such a manner that an alternating current is generated in the coil which is proportional to the effective strength of the magnetic field induced by the subsurface alternating current. Means are provided for the conversion of this induced alternating current to a direct pulsating current, the average value of which is also proportional to the average strength of the alternating magnetic field induced by the subsurface current flow.

In either case; that is, for example, with alternating or direct subsurface current, the intensity of the magnetic field induced at the surface is measured by its effect upon an inductance or pick-up coil located at the earth's surface.

The pick-up coil and fluxmeter are associated with each other in a circuit which includes an electrical bridge whereby the effect of undesirable thermoelectric and other spurious currents are balanced out. The instrument circuit may be more fully understood by reference to the accompanying drawings hereinafter described.

Application of the equipment to electrical prospecting comprises the following steps and apparatus. A suitable power supply such as, for example, a direct current generator, is connected to two surface electrodes by means of an insulated wire circuit laid on the surface of the earth. The area to be surveyed is included between the two electrodes. At one or more known points between the two electrodes, the magnetometer and pick-up coil with the associated equipment are set up. The pick-up coil usually is oriented so that its core is in a horizontal plane and located on and at right angles to an imaginary line drawn between the two surface electrodes. When oriented in this position, approximately equidistant between the surface electrodes, the pick-up coil will receive maximum influence from the horizontal component of the magnetic field created by the current flowing in the subsurface strata whose effective depth of penetration it is desired to study.

A series of readings of the fluxmeter is made during operation. First, the meter is read under normal earth conditions, that is to say, when no subsurface current is flowing through the earth. The current is then caused to flow through the earth and a second reading made after a short duration of current flow to allow steady-state conditions to be reached. The current flow is then stopped, and a fluxmeter reading again made of normal conditions. The polarity now is reversed, and current again passed through the earth, at which time another fluxmeter reading is taken. The current flow is then stopped and a reading again made of normal conditions. From this series of readings, average values for normal and current flow may be determined. In this fashion a compensation may be made for the effects of stray magnetic fields other than that induced by the subsurface current flow. The duration of current flow is short, of necessity, in order to minimize polarization effects associated with unidirectional current or very low frequency alternating current flow under these conditions. The intensity of the subsurface current utilized may be of any known value and should be varied with the electrode separation. In general it will vary between limits of from about 10 to about 100 amperes, the actual current intensity required being one which will create a magnetic field of such intensity at the surface that the fluxmeter will show a sufficient deflection to permit an accurate reading. Because of the inherent speed of fluxmeter coil movement, the duration of subsurface current flow may be short, usually varying from about 1 to about 5 seconds, thus minimizing many of the serious effects of polarization. Knowing the magnitude of the current flow between the surface electrodes, and the average deflection of the fluxmeter, the separation between the surface electrodes, and the areal position of the pick-up coil, it is possible to calculate the depth of the effective current path through the subsurface. This depth, upon comparison with the normal depth expected if the subsurface were homogeneous in nature, may show a deviation or anomaly. By studying the anomalies of such subsurface current flow, it is possible to predict the subsurface structure and/or geological conditions thereof.

In areas where troublesome variations in the earth's magnetic field are present, caused either by natural or man-made effects, certain modifications of the equipment may be made to minimize the effect of such variations. One such modification comprises the use of two identical pick-up coils connected in series opposition and placed in such positions that the magnetic field induced by the subsurface current flow substantially effects only one of the two coils, while the earth's field which is substantially uniform over a relatively large area will effect both coils in a like manner and cause effects which are of equal magnitude but opposite direction, thus rendering the overall effect of the earth's field upon the system negligible.

Another method for minimizing the effects of undesirable magnetic fields consists also in the use of two pick-up coils, one oriented with its axis in a horizontal position and the other in a vertical position. By means of a suitable reversing switch these two coils may be connected in such manner that their effects, due to the induced magnetic field, will be either additive or subtractive, and through two readings of the magnetometer, under conditions of subsurface current flow, the intensities of both the vertical and the horizontal components of the induced magnetic field may be determined. In this type of survey, this is important because a correction may then be made upon the measured intensity of induced magnetic field for the contribution to that intensity of the magnetic field induced by the current flow in the insulated surface conductors connecting the two surface electrodes with the generator. Positioning the two coils in horizontal and vertical positions results in the condition that the horizontal coil receives maximum influence from the magnetic field induced by the subsurface current flow and the vertical coil receives maximum influence from any stray magnetic field induced by the return flow of current through the insulated surface conductor connected to the surface electrodes.

The above-described equipment may be employed for surveying any given vertical cross section of the subsurface by varying the distance between the two electrodes along a fixed imaginary line running through the position of the magnetic field intensity measuring instrument which is located at a point substantially equidistant between the electrodes. In this manner, the presence of any anomalous strata at various depths below a given instrument position will be detected by a variance from the normal magnetic field strength which would otherwise be induced by the subsurface current flow. A first approximation of the normal magnetic field strength may be obtained by means of the following relationship:

$$H = \frac{Ik}{X} = \frac{\text{Current flowing through the earth times a constant}}{\text{Distance between magnetometer and the electrodes}}$$

where the measurement is being made at the mid-point of an imaginary straight line joining the two energizing electrodes. Such type of operations may be conveniently termed "vertical depth surveying."

In another method of surveying, which may be termed "constant depth surveying," the electrodes are at all times maintained equidistant from each other and are moved transversely across the earth's surface in a series of stations while the measuring instrument is likewise moved so as to be at each station on an imaginary line drawn through and spaced substantially equidistant between the electrodes. In this manner the change in depth of current penetration, as influenced by variations in the depth and configuration of strata of higher or lower conductivity than normal, may be obtained over the area traversed.

These methods of surveying together with the measuring instrument and modification thereof employed may be more clearly understood by reference to the accompanying drawings in which.

Figure 9 shows one modification of the magnetometer circuit diagram wherein two pick-up coils are employed permitting determination of both vertical and horizontal components of the field induced by subsurface current flow with two readings of the magnetometer; and Figure 10 shows the variation of the magnetometer circuit diagram which is required for the measurement of effective alternating current magnetic field intensities when the subsurface exciting current is an alternating current of low frequency.

Figure 1:
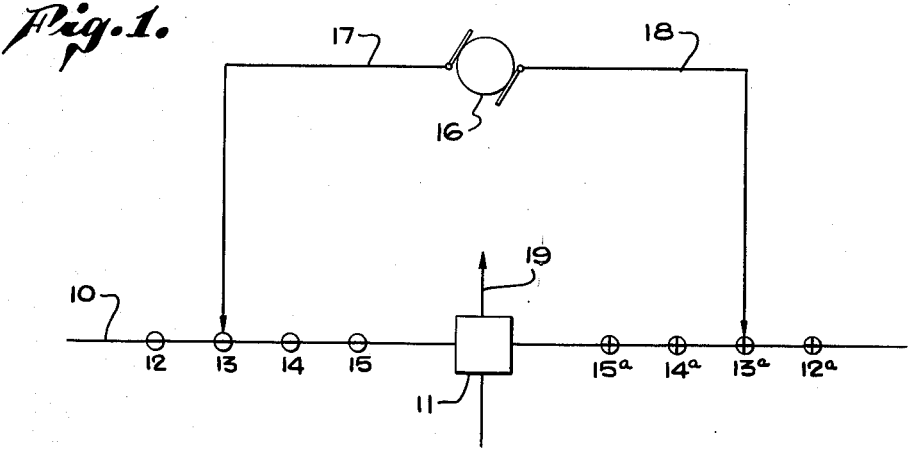
Figure 1 is a plan view of the earth's surface showing the relative position of the electrodes, power source, and measuring instrument arranged to accomplish the above-described "vertical depth" surveying operation.

Referring to Figure 1, a plan view of the various positions of the equipment of the present invention employed to obtain a "vertical depth" survey is shown. The electrodes are located on the earth's surface along the imaginary line 10, with the magnetometer 11 located on line 10 substantially equidistant between the electrodes for any given spacing. Thus, in Figure 1 the electrodes are shown positioned at points 13 and 13a (station 13), and are shown connected to a generator 16 by means of the insulated conducting wires 17 and 18. Upon completion of the required readings at station 13 the electrodes may be moved, for example, to points 14 and 14a (station 14), wherein another set of readings may be obtained, and so on through as many stations as desired. The distance between the electrodes as represented by the points 12 and 12a or 13 and 13a may vary between about 1,000 and 20,000 feet or more and may be separated for subsequent reading any desired increment of this total range such as, for example, from 100 to 1,000 feet for each subsequent station. The energizing means or power supply 16 in Figure 1 is shown connected in such a manner that electrodes 12a and 13a, etc., are of positive polarity and 12 and 13 are of negative polarity. Such a connection induces a magnetic field at the surface whose horizontal component is in the direction indicated by arrow 19. The polarity of direct current may be reversed if desired in order to average results as previously described, and to induce at the surface a magnetic field having a horizontal component in the opposite direction of that shown.

Figure 2:
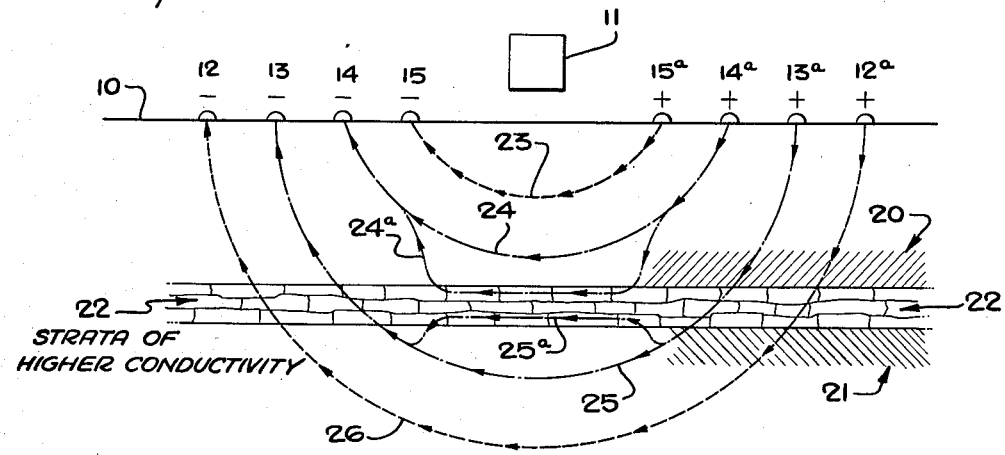
Figure 2 is a cross section of subsurface strata, above which the "vertical depth" survey operation is being carried out, showing the effect of strata having different electrical conductivities upon the effective current paths through the subsurface between the electrodes.

In Figure 2 there is given an elevation view showing a cross section of a non-homogeneous somewhat horizontally layered subsurface located along the vertical plane passing through the imaginary line 10. In the cross section view of Figure 2, the imaginary line 10 is also representative of the earth's surface, and located thereon are electrode stations 12, 13, 14, and 15. Also shown are the idealized normal effective current paths 23, 24, 25, and 26 flowing between the aforementioned electrode stations, where stratum 22 has a higher electrical conductivity than the strata 20 and 21. The magnetic field intensity as measured by magnetometer 11 at the surface, will be dependent upon the average depth of the effective subsurface current flow at a point substantially below the instrument. Thus, the reading obtained with current flow between electrodes 15 and 15a will be quite normal because the current follows the expected path 23. With current flow between electrodes 14 and 14a the reading will be less than expected because the effective path of current flow is deflected from the normal path 24 to path 24a through a stratum 22 of higher electrical conductivity. A similar anomaly occurs with current flow at electrode station 13 where the effective current follows path 25a instead of the normal path 25 giving a higher reading than expected. The presence of stratum 22, having a higher electrical conductivity than the adjacent formation, causes a deflection of the normal path of current flow at electrode stations 13 and 14 into that path which offers least electrical resistance or highest electrical conductivity to subsurface current flow. In such a manner the magnetic field intensity at the surface resulting from current flow between electrodes 14 and 14a will be less than that normally expected as a result of the downward deflection of the effective current path 24a. Similarly the magnetic field intensity at the surface with current passing between electrodes 13 and 13a (station 13) will be greater than that normally expected because of the upward deflection by stratum 22 of the effective current into path 25a. When the spacing between electrode stations is sufficiently large, for example, as at electrode station 12, the major proportion of the current flow will pierce the highly conductive stratum 22 and tend to follow the normal path with little or no deflection.

Subsurface strata having a higher electrical conductivity than that of adjacent strata may be readily detected by the method and apparatus of this invention. The increase in electrical conductivity of a given stratum over those adjacent may be due to the presence in that strata of orebodies, water, or other materials having greater electrical conductivities than the country rock in the vicinity. In petroliferous areas, the presence of such a conducting stratum as 22 in Figure 2 may be an indication of the presence therein of petroleum. Such strata, because of their greater porosity and in general the presence of saline waters, are better electrical conductors than the surrounding country rock in strata 20 and 21. Thus the presence of oil-bearing strata may be determined by the method and apparatus of my invention. Referring again to Figure 2, the presence of stratum 22 causes a downward deflection of the effective current path when the electrodes 14 and 14a are used, and an upward deflection of the upward current path when electrodes 13 and 13a are used. Anomalies in the magnetic field intensities generated at the surface and measured by magnetometer 11 will be noted when the subsurface current is caused to flow at electrode stations 13 and 14. At electrode station 14 the anomaly will be a magnetic field intensity less than that expected and at electrode station 13 it will be a magnetic field intensity greater than that expected. By careful measurement of these anomalies the vertical extent of stratum 22 of higher electrical conductivity may be determined, as well as the depth of such strata below the surface of the earth. A study by the methods of this invention of the surrounding area serves to substantiate or preclude the possibility of the presence of oil-bearing strata.

Figure 3:
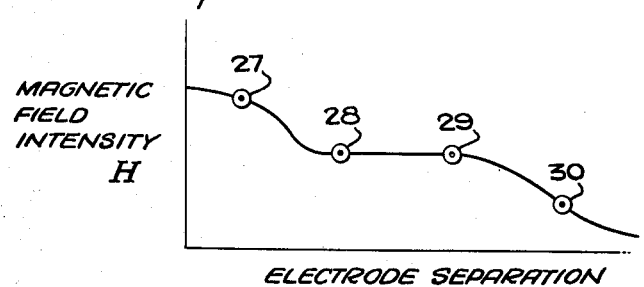
Figure 3 is illustrative of the magnetic field strength data obtained from the "vertical depth" survey operation.

In Figure 3 the magnetic field intensity, measured at each station shown in Figure 2, is shown as it varies with the spacing of the aforementioned electrodes. Points 27, 28, 29, and 30 shown in Figure 3 are the averaged resultant magnetic field intensities measured at the surface at electrode stations 15, 14, 13, and 12, respectively. The presence of the stratum 22 of higher conductivity is shown in Figure 3 by the general constancy of magnetic field intensity obtained for any electrode station positions between those of 13 and 14 represented by points 28 and 29. From the data thus obtained, the approximate depth of the stratum 22 may be ascertained from the known relationship between the depth of mean current flow and/or previously determined empirical relationship for the area under survey. Under the usual horizontally stratified conditions this depth of effective current flow will be approximately ¼ to ⅓ the distance between the two electrodes.

Figure 4:
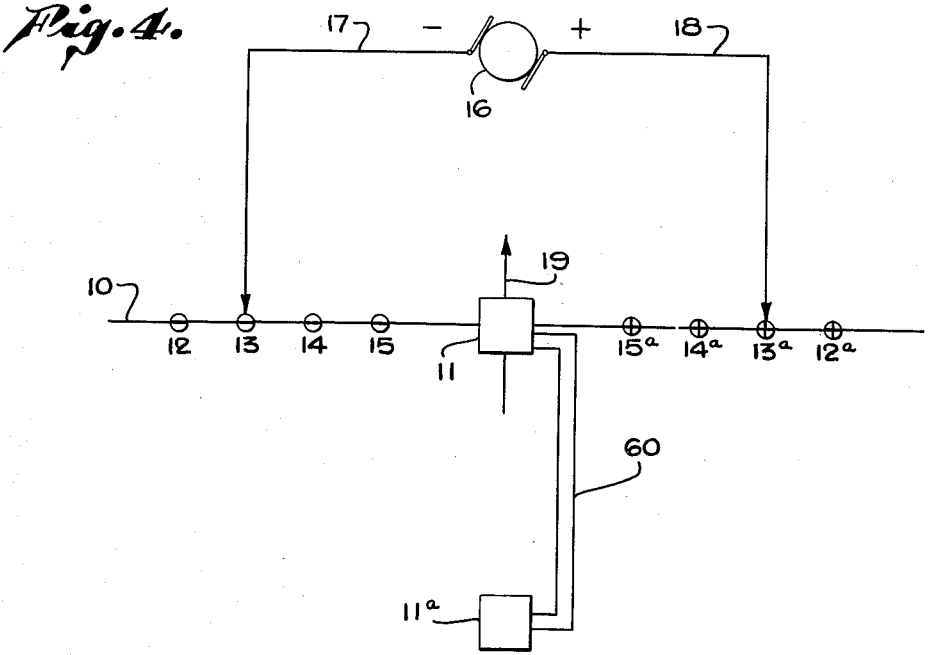
Figure 4 shows a modification of the depth survey method illustrated in Figure 1 wherein two identical pick-up coils are used, one of which is substantially unaffected by subsurface current flow.

In Figure 4 is shown a plan view of the various positions of the equipment in the present invention modified by the use of two identical pick-up coils in place of one. Corresponding numbers in this figure have the same significance as in Figure 1. The pick-up coil associated with magnetometer 11 is connected by means of double wire insulated cable 60 to a second pick-up coil 11a. The two pick-up coils are connected in series opposition so that any electrical current induced in one has an equal and opposite counterpart induced in the other when both are subjected to the same changes in magnetic flux. One coil is maintained on a line between the two energizing electrodes, while the second coil is positioned at some remote point so as not to be influenced substantially by the magnetic field created during the passage of the energizing current through the subsurface. By way of illustration, the second coil may be placed at a distance of two or three times the intended depth of penetration from the first coil, and oriented in the same direction as the first coil. The pick-up coil 11a is of identical electrical characteristics as the one positioned at 11 with the magnetometer. Due to the directional properties of the coils, and the difference in distances to the paths of mean current flow, the field created by the flow of current in the subsurface will have a much less effect on coil 11a, than upon coil 11. The difference between the two effects may be calculated knowing the configuration and distances involved. Diurnal variations in the earth's field, however, will affect both coils in substantially an equal degree due to the large lateral extent of such variations. Therefore, since the coils are connected in series opposition, the effects of diurnal variations will cancel out, while the effect of the magnetic field created by the flow of current in the subsurface will give a measurable difference, from which the true magnetic field may be calculated. It will be obvious that the first and second coils may have many different relative positions of one with respect to the other, but the desirable operating technique is to place the first coil where it will be influenced to a maximum extent by the magnetic field created during passage of the current into the earth, and to place the second coil where it will be influenced to a less or negligible extent by such created field, but still to the same extent as the first coil by the diurnal variations. Knowing the constants of the two coils and the configuration and distances involved, calculations may be made to ascertain the true value of the field existing at the desired point of measurement.

Figure 5:
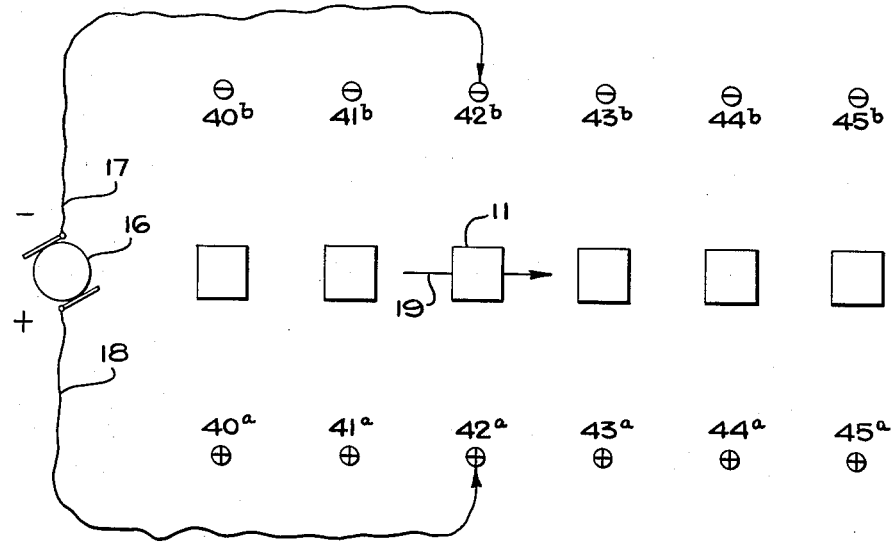
Figure 5 shows a plan view of the orientation of electrodes, power source, and one type of measuring equipment to accomplish what may be termed "constant depth" surveying.

In Figure 5 is shown a plan view of a constant depth method of surveying whereby the continuity of course of a formation of higher or lower conductivity than the adjacent structure may be determined. Herein the distance separating the electrodes 40a and 40b, 41a and 41b, etc. is maintained constant. In this manner the effective current flow between them normally will be maintained at a substantially constant depth. By determining with the magnetometer 11 the variations in magnetic field intensity induced by the variations in depth of the subsurface current flow between the electrodes at the various stations shown, any lateral inhomogeneities and/or variations in depth of the strata being studied may be ascertained.

Figure 6:
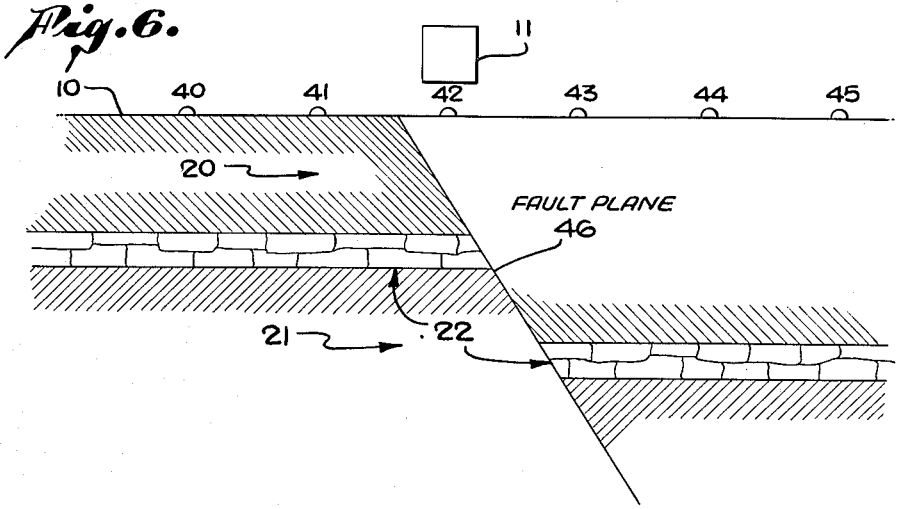
Figure 6 is a cross section view of one type of subsurface condition amenable to the "constant depth" survey procedure.

The effect of lateral changes or variations in the strata under observation may be illustrated in an elevation view as in Figure 6 wherein stations 40, 41, 42, etc. corresponding to electrodes 40a, 40b; 41a, 41b, etc., are shown traversing the earth's surface above stratum 22 of higher conductivity than the adjacent formation. The current flowing through the electrode stations 40, 41, and 42 is deflected into the stratum 22 giving substantially constant field intensity values for each of these electrode positions, whereas, the current flowing through electrode stations 43, 44, and 45 is deflected into the stratum 22 located at a lower plane than that portion of the stratum lying below electrode stations 40, 41 and 42. In this manner the field intensity as measured at the surface by instrument 11 at electrode stations 43, 44 and 45 will be lower than those measured at stations 40, 41 and 42 by virtue of the change in depth of the highly conductive stratum 22 through which the current is caused to flow. In this manner it is readily determinable that at a point or series of points between electrode stations 42 and 43 the stratum 22 is faulted as represented by fault plane 46.

An entirely analogous procedure may be applied to the locations of those types of geological formations known as "anticlines" which are upfolds or arches of the subsurface strata. A stratum of higher conductivity may be followed through an anticline by the method used in the location of the fault plane previously mentioned and the uppermost reaches of the formation located. Accurate location of such formations is desirable because in a petroliferous area petroleum deposits usually are associated with such faulted and anticlinal types of subsurface structure.

Figure 7:
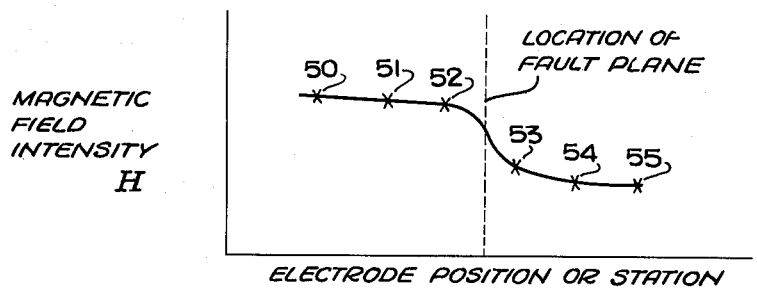
Figure 7 illustrates the general data obtained by the "constant depth" method and the determination therefrom of the desired information.

Figure 7 illustrates in graphic form the data thus determinable by the method as shown in Figures 5 and 6. The magnetic field intensity as measured at electrode stations 40, 41, and 42 is represented in Figure 7 by the points 50, 51, and 52 respectively, and is seen to be substantially constant for these three stations. As the electrode positions pass through fault plane 46, a lower field intensity is obtained as described above and is illustrated on the graph of Figure 7 by the points 53, 54, and 55 corresponding to the electrode stations 43, 44, and 45, respectively. Thus, by plotting the data obtained according to the constant depth method of surveying in the manner shown in Figure 5, the variations in depth of any given stratum may be accurately determined by variations in the plot of field intensity versus electrode positions.

The two prospecting methods illustrated by Figures 1 and 5 differ from each other in the information obtainable therefrom. The "vertical depth" surveying method comprises the successive change in electrode spacing along a given imaginary line so as to increase the normal expected "vertical depth" of effective current flow between the electrodes at a given point beneath the earth's surface. The "constant depth" surveying method comprises the successive positioning of the electrodes along two parallel imaginary lines so that they are at all times equidistant from each other on parallel transverse electrode station lines which are perpendicular to the imaginary electrode lines but located at different positions on the earth's surface. A combination of the two methods results in a means of ascertaining depth and lateral changes of any given subsurface stratum of higher or lower conductivity than the adjacent formation.

Figure 8:
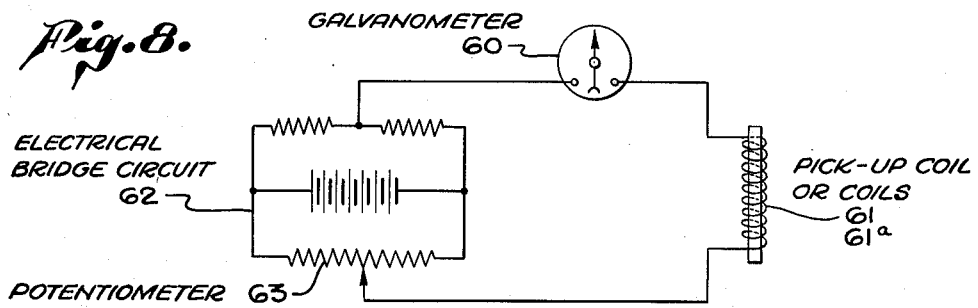
Figure 8 shows the fundamental electrical circuit diagram of the magnetometer instrument of the present invention employed to determine the variations at the surface of magnetic field intensity.

In Figure 8 is shown the fundamental circuit diagram of the instrument of the present invention used to determine the intensity of the magnetic field at the surface of the earth induced by the current caused to flow between the aforementioned electrodes. This consists of substantially three parts, pick-up coil means 61, galvanometer 60, and electrical bridge circuit 62. The pick-up coil 61 is connected in series with the galvanometer 60 and electrical bridge circuit 62 in such a manner that potentiometer 63 may be varied under conditions of no current flow to give a normal zero reading on the galvanometer. Thus compensation may be made for spurious thermoelectric currents set up in the circuit or a mechanical rotation of the galvanometer caused by its torsion suspension system being improperly adjusted. Under conditions of current flow between previously mentioned electrode stations the formation of a magnetic field at the surface resulting from the subsurface current flow causes a change in the current through the pick-up coil 61 which is measured by galvanometer 60.

Figure 9 shows a modification of the fundamental circuit diagram of the magnetometer of the present invention, the construction of which permits the measurement of intensities of both the vertical and horizontal components of induced magnetic fields. This modification comprises two pick-up coils, the horizontal coil 73 oriented as described heretofore, that is, perpendicular to a line joining the two surface electrodes; and the vertical coil 72 which is oriented vertically. With such an arrangement, it will be seen that horizontal coil 73 will be influenced by the horizontal field associated with the flow of subsurface current. The vertical coil 72 will be influenced by the vertical field associated with the flow of current in the insulated surface conductor connecting the two surface electrodes to the generator.

In the temperate zone, the earth's field has an inclination of approximately 60°. Under these conditions, it would be desirable to have the vertical component coil 72 produce an effect greater than the horizontal component coil 73, in order to allow for the effects of orientation, etc., by means of a tapped winding, so arranged that any desired number of turns may be included in the circuit. By simple algebra, the effects of the vertical and the horizontal fields may be separated by making measurements of the sum and the difference between the two coils. This can be accomplished instrumentally by means of a simple double-pole, double-throw, reversing switch 71, which in one position allows the V and H fields to be additive, and in the other position gives the difference between the V and H fields. The method of computing readings may be as follows:

$$V - H = A$$
$$V + H = B$$
$$2V = (A + B)$$
$$V = \frac{(A + B)}{2}$$

and furthermore, $$V - A = H$$
Vertical field $= VkN$
Horizontal field $= HkN$ wherein $k$ denotes the constant of the coil and $N$ denotes the number of turns included in the circuit. Knowing these constants, it is possible to calculate the intensity of each magnetic field.

The two pick-up coils 72 and 73 are associated in a circuit including galvanometer 70 and electrical bridge circuit 74 as previously indicated.

In Figure 10 is shown the fundamental circuit diagram of the magnetometer instrument which is applicable to the measurement of the intensities of magnetic fields which are induced at the surface when a subsurface alternating current of low frequency is used. This consists substantially of four parts, a pick-up coil 83, a full wave rectifier 82, a filter consisting of choke coil 81 and condenser 84, a galvanometer 80 and an electrical bridge circuit 85. The pick-up coil 83 is equipped with a winding, the ends of which are connected directly to the anodes 87 and 87a of full-wave rectifier 82 and also equipped with an electrical connection made to the electrical center 88 of the coil winding length. The cathode 89 of full-wave rectifier 82 is connected in series with choke coil 81, which in conjunction with the filter condenser 84 connected between the electrical center tap 88 of the pick-up coil and the galvanometer end of choke coil 81 converts the fluctuating direct current output of the pick-up coil and rectifier system to a smooth unvarying unidirectional current whose magnitude is proportional to the effective intensity of the alternating magnetic field being measured. This pick-up coil, rectifier, and filter system is connected in a closed series circuit with galvanometer 80 and electrical bridge circuit 85. Galvanometer 80 comprises an uncompensated moving coil unit. The electrical bridge circuit 85 contains a potentiometer 86 which may be varied under conditions of no subsurface current flow to give a normal zero reading on the galvanometer. The effects of some extraneous magnetic fields on the system are thereby effectively balanced out. The operation of this modification of magnetometer differs from that applicable to the use with direct current magnetic fields in that during measurement of fluctuating magnetic fields energy is continuously imparted to the magnetometer instrument, whereas with the measurement of direct current magnetic fields the energy transferred to the magnetometer which permits measurement of the field intensity occurs only during the induction of the field when the flow of current in the subsurface is initiated.

Having described and illustrated my invention and realizing that many modifications thereof may occur to those skilled in the art without departing from the spirit or scope of the invention, I claim:

1. An apparatus for determining the location of anomalous underground structure which comprises electrodes in contact with the earth's surface at spaced points, an electric direct current generator, insulated conductors connecting said generator to said electrodes, a pick-up coil maintained substantially equidistant between and on an imaginary line running through said electrodes and a compensated galvanometer electrically connected to said pick-up coil, said galvanometer being magnetically compensated and characterized by having substantially no restoring torque associated with its indicating mechanism whereby said compensated galvanometer registers an indication constituting a unidirectional deflection of its indicating mechanism upon and in proportion to a change in the direct current magnetic field intensity intersecting said pick-up coil and induced by a change in subsurface direct current between said electrodes.

2. An apparatus for determining the location of anomalous underground structure which comprises electrodes in contact with the earth's surface at spaced points, a direct current generator, insulated conductors connecting said generator to said electrodes, a pair of pick-up coils electrically connected to one another, at least one of which is supported substantially equidistant between and on an imaginary line passing through said electrodes, and a compensated galvanometer electrically connected to said pick-up coils, said compensated galvanometer being magnetically compensated so that no restoring torque is applied to the moving coil indicating mechanism thereof, said compensated galvanometer being thereby adapted to register an indication constituting a unidirectional deflection of its indicating mechanism proportional to the energy induced into said pick-up coils during a change in intensity of a direct current magnetic field resulting from a change in the magnitude of a subsurface direct current flowing between said spaced points.

3. An apparatus according to claim 2 wherein said pick-up coil comprises a single multilayer coil of highly conductive wire supported on and insulated from a bar of magnetically permeable metal.

4. An apparatus according to claim 3 wherein said magnetically permeable metal is an iron alloy.

5. An apparatus for determining the location of anomalous underground structure which comprises electrodes in contact with the earth's surface at spaced points, a direct current generator, insulated conductors connecting said generator to said electrodes, a pair of pick-up coils, said pick-up coils being electrically connected in series opposition and physically maintained in coaxial relation to each other, one of said coils being established on said imaginary line running through said electrodes thereby receiving maximum influence of the subsurface current flow, the other of said coils being established at a distance from the first so as to be substantially unaffected by said subsurface current flow, and a compensated galvanometer electrically connected to said pick-up coils, said compensated galvanometer being magnetically compensated so that no restoring torque is applied to the moving coil indicating mechanism, said compensated galvanometer being thereby adapted to give an indication constituting a unidirectional deflection of its indicating mechanism proportional to the energy induced into said pick-up coils during the establishment of a subsurface direct current flowing between said spaced points, that is, during the build-up from zero to a maximum value of said subsurface direct current.

6. An apparatus for determining the location of anomalous underground structure which comprises electrodes in contact with the earth's surface at spaced points, a direct current generator, insulated conductors connecting said generator to said electrodes, a pair of pick-up coils both of said pick-up coils being maintained on said imaginary line passing through said electrodes with their axes at right angles to each other, and a compensated galvanometer electrically connected to said pick-up coils, said compensated galvanometer being magnetically compensated so that no restoring torque is applied to the moving coil indicating mechanism, said compensated galvanometer being thereby adapted to give an indication constituting a unidirectional deflection of its indicating mechanism proportional to the energy induced into said pick-up coils during the establishment of a subsurface direct current flowing between said spaced points, that is, during the build-up from zero to a maximum value of said subsurface direct current.

7. An apparatus according to claim 6 wherein one of said coils is maintained with its axis in a horizontal plane to receive maximum influence from the subsurface current flow and the other coil is maintained with its axis in a vertical plane to receive maximum influence from the return current flow through said conductors.

8. A method of determining underground structure which comprises causing a direct current to flow in a circuit including an external path insulated from the earth and connected thereto at separated points and an underground path between said separated points and determining the magnitude of the field intensity resulting from the sub-surface direct current flow by measuring with stationary inductance coil means, located at a point substantially equidistant between said separated points, the energy induced into said stationary inductance coil means by the changing direct current field resulting from the change in the subsurface current flow between values of zero and a maximum.

9. A method of determining underground structure which comprises locating a pair of electrodes at spaced points in contact with the earth's surface, positioning a stationary inductance coil means at a point substantially equidistant between said electrodes, causing a direct electric current to flow through the earth between said electrodes and determining the intensity of the direct current magnetic field induced by said current flow through the earth by measuring the energy induced into said stationary inductance coil means by the change in the direct current magnetic field resulting from the change in the subsurface current flow between values of zero current and a substantially constant value of maximum current.

10. A method for determining underground structure which comprises initiating a direct current flow through the earth's subsurface and determining the intensity of the resulting magnetic field at the surface by measuring the energy induced into a stationary inductance coil positioned substantially at said surface by the change in the direct current magnetic field resulting from the change in subsurface direct current flow between values of zero and a maximum current immediately following the initiation of said direct current flow.

11. A method for determining subsurface structure which comprises initiating the flow of a direct electric current through the subsurface and determining the intensity of the magnetic field thus established by measuring at the surface the energy induced into a stationary inductance coil positioned substantially at said surface by the change in direct current magnetic field intensity resulting from the build-up of the subsurface direct current flow from a value of zero to a maximum value immediately following the initiation of said direct current flow through the subsurface.

12. A method for determining underground structure by measuring the intensity of a magnetic field established by a subsurface flow of direct electric current which comprises positioning a stationary inductance coil substantially at the earth's surface prior to passing any current through the subsurface, then initiating a subsurface flow of direct current thereby establishing a direct current magnetic field and determining the average depth of said subsurface direct current flow by measuring the energy induced into said inductance coil by the change in field intensity resulting from the build-up of the subsurface direct current from a value of zero to a maximum value immediately following the initiation of said subsurface current flow.

13. A method for determining underground structure which comprises locating a pair of electrodes at spaced points in contact with the earth's surface, positioning a stationary inductance coil means at a point substantially equidistant between said electrodes, causing a direct electric current to flow through the earth between said electrodes, determining the intensity of the magnetic field resulting from the subsurface current flow by measuring the energy induced into said stationary inductance coil means by the change in said magnetic field resulting from a change in said subsurface current flow between values of zero and a maximum, subsequently moving said electrodes to different positions of different separation along the same transverse line at points substantially equidistant from said stationary inductance coil means and again measuring the energy induced thereinto by the change in magnetic field resulting from the change in subsurface current flow between values of zero and a maximum for each positioning of said electrodes.

14. A method of determining underground structure which comprises locating a pair of electrodes at spaced points in contact with the earth's surface, positioning an inductance coil means at a point substantially equidistant between said electrodes, initiating a direct electric current flow through the earth between said electrodes, determining the field intensity of the magnetic field resulting from the subsurface current flow by measuring the energy induced into said stationary inductance coil means during the change in said magnetic field during the change in said subsurface current flow between values of zero and a maximum, subsequently moving said electrodes to different positions of substantially equal separation on a series of parallel lines in a transverse path across the earth's surface, positioning said inductance coil means substantially in line with and equidistant between said electrodes, initiating another direct current flow through the earth between said electrodes and again determining the field intensity of the magnetic field resulting from the subsurface flow by measuring the energy induced into said stationary inductance coil means during the change in magnetic field intensity resulting from the change in said subsurface current flow between values of zero and maximum current flow through the earth between said electrodes at each successive positioning thereof.

15. A method of determining the characteristics of underground structure which comprises locating a pair of electrodes at spaced points in contact with the earth's surface, attaching to said electrodes an electric direct current generation means by two insulated conductors disposed adjacent the earth's surface, positioning a stationary inductance coil means at a point substantially equidistant between said electrodes, initiating a direct electric current flow through the earth between said electrodes and determining the intensity of the magnetic field resulting from said current flow through the earth by measuring the energy induced into said inductance coil by the change in magnetic field resulting from the change in subsurface current flow between values of zero and maximum current, subsequently moving said electrodes to positions of changed separation substantially equidistant from said inductance coil means along the same transverse line while retaining said inductance coil in a stationary position, repeating the determination of the intensity of the magnetic field induced by said current flow through the earth between said electrodes at each successive positioning thereof, subsequently locating said electrodes in contact with the earth's surface at substantially equal separation in a series of stations along a transverse path across the earth's surface, locating said inductance coil means on the same imaginary line as said electrodes at each station, initiating a direct current flow through the earth between said electrodes at each successive station and repeating the determination of the intensity of the magnetic field induced by said direct current flow thereby determining the depth, course, and variation in subsurface strata of anomalous electrical conductivity which penetrate the vertical plane at each electrode station.

References Cited in the file of this patent

UNITED STATES PATENTS

| 1,803,405 | Ricker | May 5, 1931 |
| 1,859,005 | Ricker | May 17, 1932 |
| 1,902,265 | Rieber | Mar. 21, 1933 |
| 1,906,271 | Jakosky | May 2, 1933 |
| 1,938,535 | Peters | Dec. 5, 1933 |
| 2,046,436 | Wascheck | July 7, 1936 |
| 2,105,247 | Jakosky | Jan. 11, 1938 |
| 2,123,045 | Hoare | July 5, 1938 |
| 2,151,627 | Vacquier | Mar. 21, 1939 |
| 2,291,692 | Cloud | Aug. 2, 1942 |
| 2,294,395 | Evjen | Sept. 1, 1942 |
| 2,334,593 | Wyckoff | Nov. 16, 1943 |
| 2,427,666 | Felch et al. | Sept. 23, 1947 |

OTHER REFERENCES

"Geophysical Exploration" by C. A. Heiland, 1940, published Prentice-Hall, Inc., of New York City, pp. 764–773.

"Institution of Electrical Engineers," vol. 9, Part I, No. 70, October 1946; pp. 435–446.